United States Patent [19]
Burgess

[11] Patent Number: 5,609,468
[45] Date of Patent: Mar. 11, 1997

[54] CENTRIFUGAL SEAL ASSEMBLY

[75] Inventor: Kevin E. Burgess, Carlingford, Australia

[73] Assignee: Warman International Limited, Artarmon, Australia

[21] Appl. No.: 525,780

[22] PCT Filed: Mar. 10, 1994

[86] PCT No.: PCT/AU94/00116
§ 371 Date: Sep. 8, 1995
§ 102(e) Date: Sep. 8, 1995

[87] PCT Pub. No.: WO94/21923
PCT Pub. Date: Sep. 29, 1994

[30]  Foreign Application Priority Data

Mar. 18, 1993 [AU] Australia ................... 7894/93

[51] Int. Cl.⁶ ........................................... F01D 5/00
[52] U.S. Cl. ................... 415/171.1; 416/223 B; 416/DIG. 2
[58] Field of Search ............. 415/171.1; 416/223 B, 416/DIG. 2, DIG. 5

[56]      References Cited
U.S. PATENT DOCUMENTS 1,932,214 10/1933 Hornschuch .
2,764,945 10/1956 Heep .
4,884,945 12/1989 Boutin et al. ............... 415/171.1
4,915,579 4/1990 Whittier et al. ............. 415/171.1
5,261,786 11/1993 Sidelko ...................... 415/171.1
5,393,199 2/1995 Alizadeh ..................... 415/DIG. 2

FOREIGN PATENT DOCUMENTS 109442 1/1939 Australia .
2414406 10/1975 Germany .

Primary Examiner—John T. Kwon
Attorney, Agent, or Firm—Darby & Darby

[57]           ABSTRACT

A centrifugal seal assembly for a pump, including a pump casing having a pump chamber, a pump impeller, an impeller passageway and a rotatable pump impeller shaft, the seal assembly comprising a rotatable main body disposed within a seal chamber and attached to the pump shaft, a plurality of circumferentially spaced apart vanes on one side of the main body, each vane including a curved leading edge portion, the vanes being configured such that $R_v/D_{eo}$ is in the range from 0.3 to 0.7, where $R_v$ equals the curvature of the leading edge of the vanes and $D_{eo}$ equals the outer diameter of the vanes.

28 Claims, 3 Drawing Sheets

CENTRIFUGAL SEAL ASSEMBLY

This invention relates to centrifugal seal assemblies suitable for use in centrifugal pumps and more particularly to a seal assembly for the pump shaft.

A typical pump assembly and associated seal assembly is shown in the drawings in which.

Figure 1:
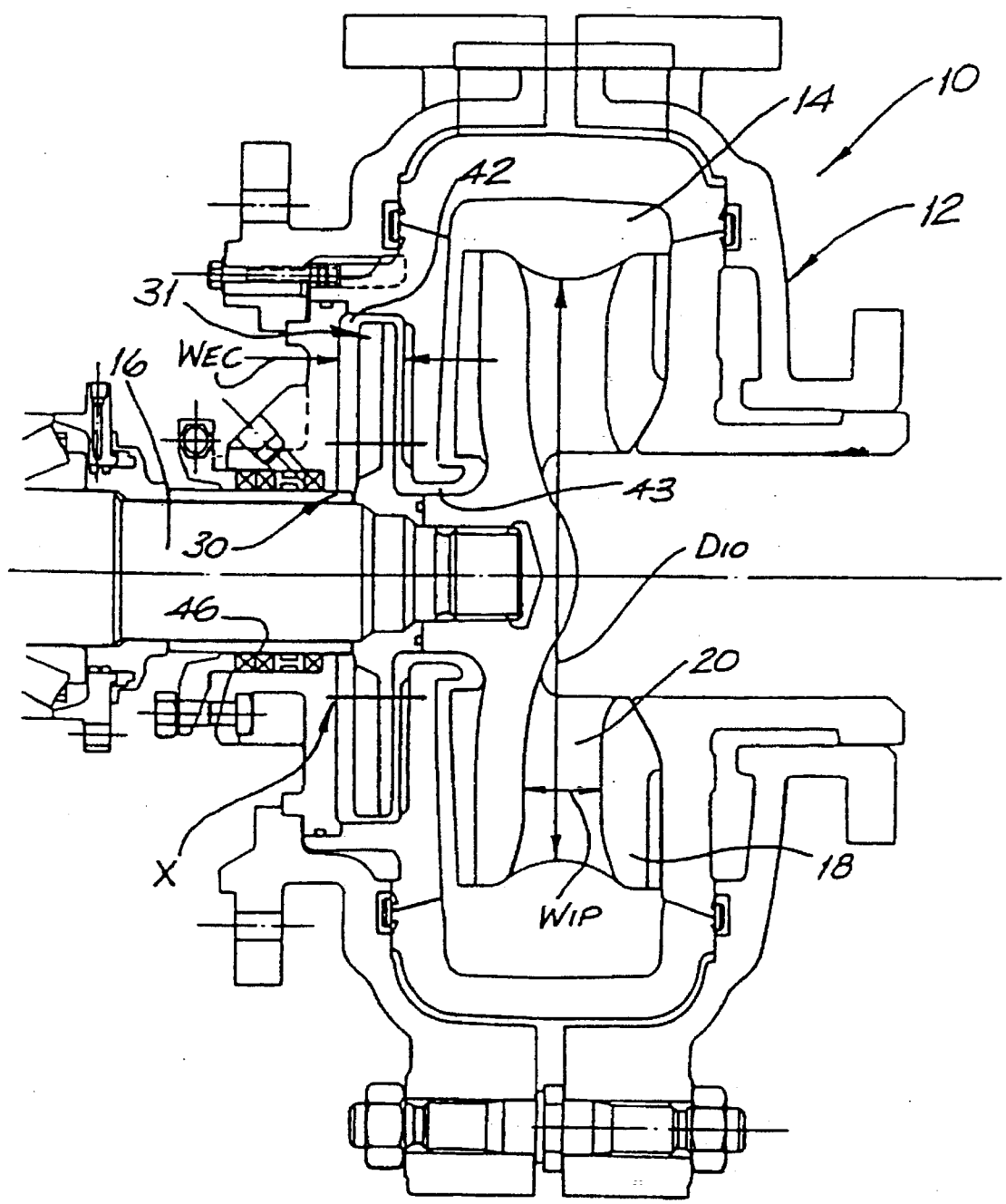
FIG. 1 is a schematic side elevation of a pump and centrifugal seal assembly, the centrifugal seal assembly being in accordance with a preferred embodiment of the invention.
Figure 2:
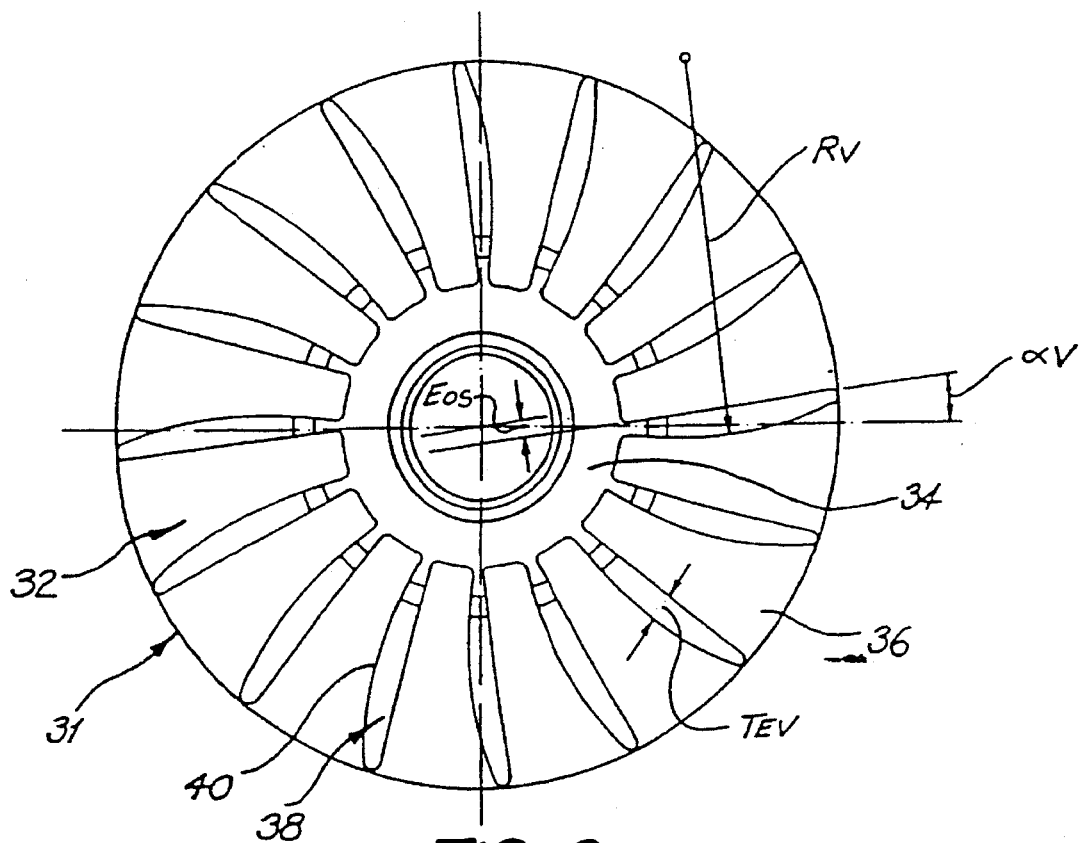
FIG. 2 is a plan view of a seal device for use in the seal assembly.
Figure 3:
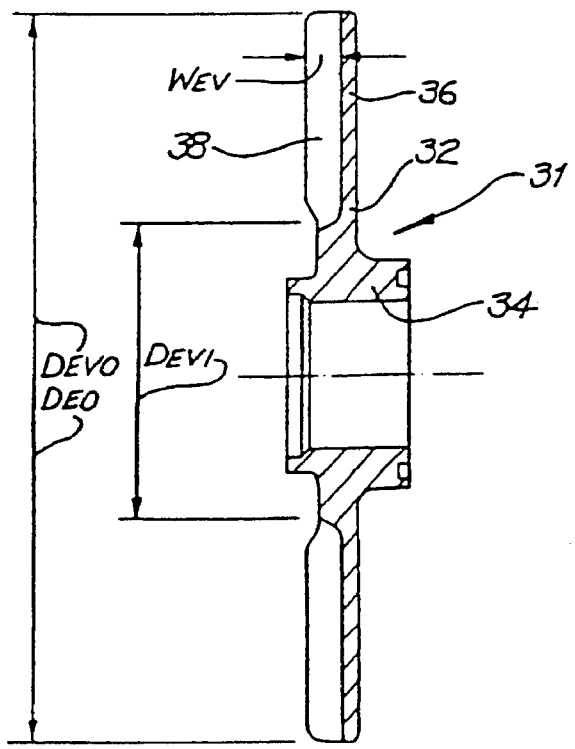
FIG. 3 is a sectional side elevation of the device shown in FIG. 2.

Referring to the drawings there is shown a pump generally indicated at 10 comprising a pump casing 12 with a pump chamber 14 therein. The pump 10 further includes a pump impeller 18 having an impeller passageway 20, the impeller 18 being mounted for rotation on pump shaft 16 and disposed within pump chamber 14.

To one side of the pump casing 12 is a centrifugal seal assembly 30 which includes a rotatable seal device 31. The seal device 31 comprises a main body 32 having an inner section 34 which is mounted to the pump shaft 16 and an outer section 36 which in the form shown is disc-like in structure. The device 31 is mounted to the pump shaft 16 for rotation therewith. The seal device 31 is disposed within a seal chamber 42 which is in communication with the pump chamber 14 via passageway 43.

The seal device 31 includes a plurality of vanes 38 which extend from the inner section 34 of the main body 31 and terminate at the outer peripheral edge of the outer section 36. The vanes 38 are spaced apart from one another in the circumferential direction and include a curved leading edge with respect to the direction of rotation of the device.

The centrifugal seal assembly 30 is used in conjunction with a main seal apparatus 46 which may be in the form of packings, as shown, or lip seals or other types of seals.

Shaft seal assemblies of this general type for centrifugal pumps are known. The rotating seal device generates a dynamic pressure at its periphery. During rotation liquid within the seal chamber is forced to rotate with the device. This pressure helps to counter balance the pressure generated from the pump impeller. The reduced pressure at the pump shaft permits the main seal apparatus to function as low pressure seal and thereby improve the seal life. The purpose of the main shaft seal is to prevent leakage when the pump has stopped.

Properly applied centrifugal seal assemblies can generate sufficient pressure to totally counter balance the pump pressure. In this situation the pumped fluid will remain clear of the pump shaft and the main shaft seal apparatus can run "dry" under these ideal conditions. To provide cooling and lubrication it is necessary to use some type of lubrication which may be in the form of grease or water from some external source.

In operation the rotating seal device generates a rotating fluid field in the seal chamber. To maximise the pressure generated various options are available. For example, by increasing the outer diameter of the device, the pressure can be increased according to the square of the speed of rotation.

Furthermore, it has been found that the width of the seal device has less of an influence on performance but generally should be relatively narrow. The shape of the seal device's vanes has been found to be particularly important in maximising pressure and minimising slip and turbulence. Slip will reduce the pressure generated while turbulence in a slurry containing particles will cause wear and reduce component life.

An object of the present invention is to provide an improved seal device and seal assembly incorporating such a device which improves the performance of the device and assembly.

Basically, the invention relates to a centrifugal seal device suitable for use with a pump which comprises a pump casing having a pump chamber therein and a pump impeller with an impeller passageway, the pump impeller being mounted on a rotatable shaft, the pump impeller being disposed within the pump chamber.

The seal device includes a main body which is disposed within a seal chamber and mounted for rotation on the pump shaft. The device includes a plurality of circumferentially spaced apart vanes on one side of the main body, the vanes extending from an inner zone of the main body towards or terminating at the outer peripheral edge of the main body. Each vane includes a curved leading edge portion with respect to the direction of rotation of the device and a main axis which extends between the inner and outer ends of the vane. The main body may include an inner section and an outer section.

According to the present invention the vanes of this seal device are configured in accordance with at least one and preferably both, of the following relative dimensions.

Tev/Wev from 0.3 to 2.0 preferably between 0.3–1.5 and more preferably about 0.85

Rv/Deo from 0.3 to 0.7 and more preferably about 0.5

Where

Tev=thickness of the vanes

Wev=width of the vanes

Rv=curvature of the leading edge of the vanes

Deo=outer diameter of the vanes.

Advantageously, the main axis of the vanes can extend radially or be angularly inclined rearwardly with respect to the direction of rotation from the radial direction by an angle αv from 0°–30° and more preferably about 7.5°.

Preferably, the main axis of the vanes is offset from the axis of rotation of the pump shaft preferably by a distance up to and including the thickness of the vanes of the device. For example, the main axis of the vanes could typically cut a radial line between the inner and outer edges of the main body such as in the region of the diameter of the inner section.

The ratio of the inner and outer diameter of each vane may be constrained within limits so as to further improve performance. The ratio $D_{evi}/D_{evo}$ may be from 0.2–0.7, preferably between 0.2–0.6 and more preferably 0.4 or 0.5, wherein $D_{evi}$ is the inner diameter of the vanes and $D_{evo}$ is the outer diameter of the vanes.

In addition the width of the seal chamber (Wec) to the width of the impeller passageway (Wip) may be in the range from 0.3 to 1.25 and preferably from 0.5–1.25.

It has been found for example, that seal devices give optimum performance when the ratio outer diameter of the seal device to that of the pump impeller is greater than 0.6. Sufficient pressure can be generated under such conditions without consuming too much extra power.

The ratio of vane width on the device to that of width of the impeller vane passageway is normally from 0.05 to 0.6, and preferably from 0.1 to 0.6. Furthermore, the width of the vanes of the seal device are from 0.2–0.5 of the width of the seal chamber. These width ratios can vary especially when the pump includes clearances for axial adjustment of the impeller. Such axial adjustment permits optimum performance to be achieved from the pump impeller. The clearance in the seal chamber does not however greatly affect the performance of the seal device provided it has a sufficiently high number of vanes to minimise slip of the fluid past the vanes. This slip will reduce the pressure generated by the seal device and cause turbulence and wear. The number of vanes can desirably vary from 6 to 30 and 16 has been found to be a good compromise for sealing and ease of manufacture.

Referring to the drawings each of the dimensions referred to above are shown.

It has been found that vanes designed in accordance with the above parameters, maximise pressure generation and minimise turbulence. The vanes include a curved leading edge and the trailing edge may be substantially flat or less curved than the leading edge.

Centrifugal sealing assemblies according to the present invention may be used with any main seal apparatus such as packings, lip seals or the like.

The following examples are provided to illustrate the improved performance of pumps incorporating a centrifugal seal assembly according to preferred embodiments of the present invention.

EXAMPLE 1

The performance of a conventional pump having a 100 mm inlet and 75 mm outlet was compared with a pump having the same inlet and outlet but having parameters in accordance with the invention. Details of the conventional and new pump are set out below:

|  | CONVENTIONAL | NEW |
|---|---|---|
| Tev | 8 mm | 7.8 mm |
| Wev | 19 mm | 10.0 mm |
| Rv | ∞ (straight) | 111 mm |
| Deo | 184 mm | 215 mm |
| αv | 0 | 7.5° |
| Devo | 184 mm | 215 mm |
| Devi | 130 mm | 124 mm |
| Wec | 49 mm | 27 mm |
| Wip | 35 mm | 35 mm |
| Tev/Wev | 0.42 | 0.78 |
| Rv/Deo | n/a | 0.516 |
| Devi/Devo | 0.71 | 0.577 |
| Wec/Wip | 1.4 | 0.77 |

The pumps were run at speeds of 1000 rpm and 1300 rpm.

Figure 4:
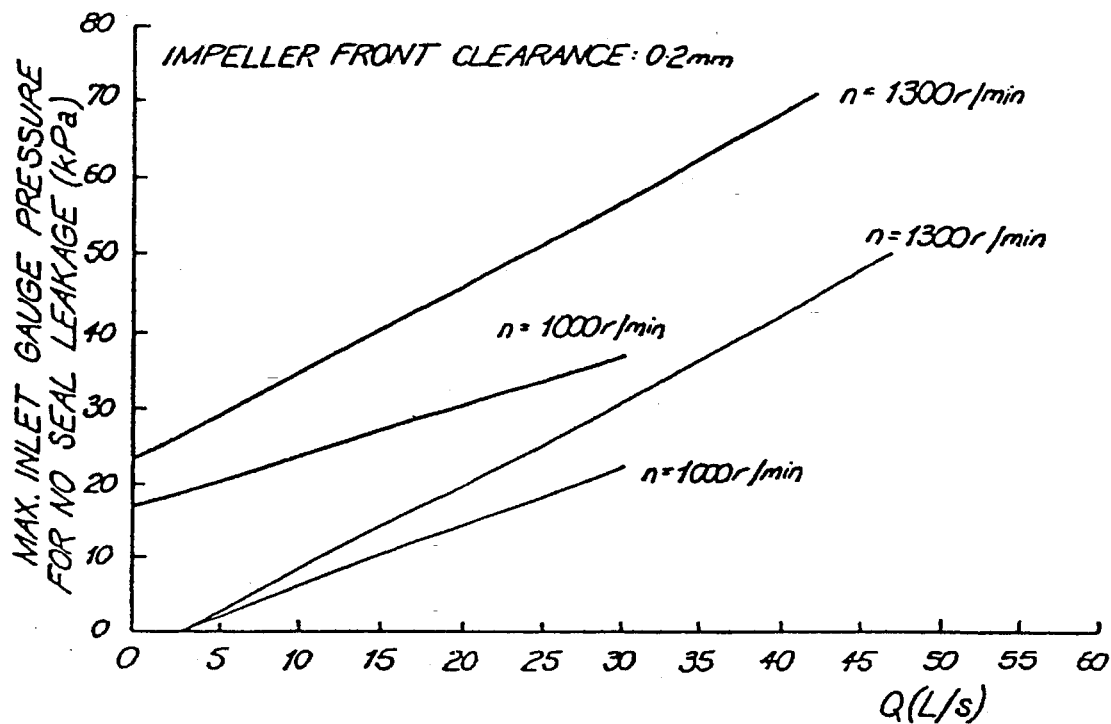

The graph which forms FIG. 4 of the drawings illustrates the difference in performance between the two pumps the darker line representing the pump according to the invention and the lighter line the conventional pump.

As can be seen the maximum inlet gauge pressure for no seal leakage increases significantly for the pump according to the present invention.

EXAMPLE 2

The performance of a conventional pump having a 200 mm inlet and 150 mm outlet was compared with a pump having the same inlet and outlet but having parameters in accordance with the invention. Details of the conventional and new pump are set out below:

|  | CONVENTIONAL | NEW |
|---|---|---|
| Tev | 13 mm | 15.6 mm |
| Wev | 32 mm | 18.0 mm |
| Rv | ∞ (straight) | 199 mm |
| Deo | 362 mm | 385 mm |
| αv | 0 | 7.5 mm |
| Devo | 362 mm | 385 mm |
| Devi | 206 mm | 194 mm |
| Wec | 78 mm | 47 mm |
| Wip | 76 mm | 76 mm |
| Tev/Wev | 0.41 | 0.867 |
| Rv/Deo | n/a | 0.517 |
| Devi/Devo | 0.57 | 0.504 |
| Wec/Wip | 1.03 | 0.618 |

The pumps were run at speeds of 500 rpm and 700 rpm.

Figure 5:
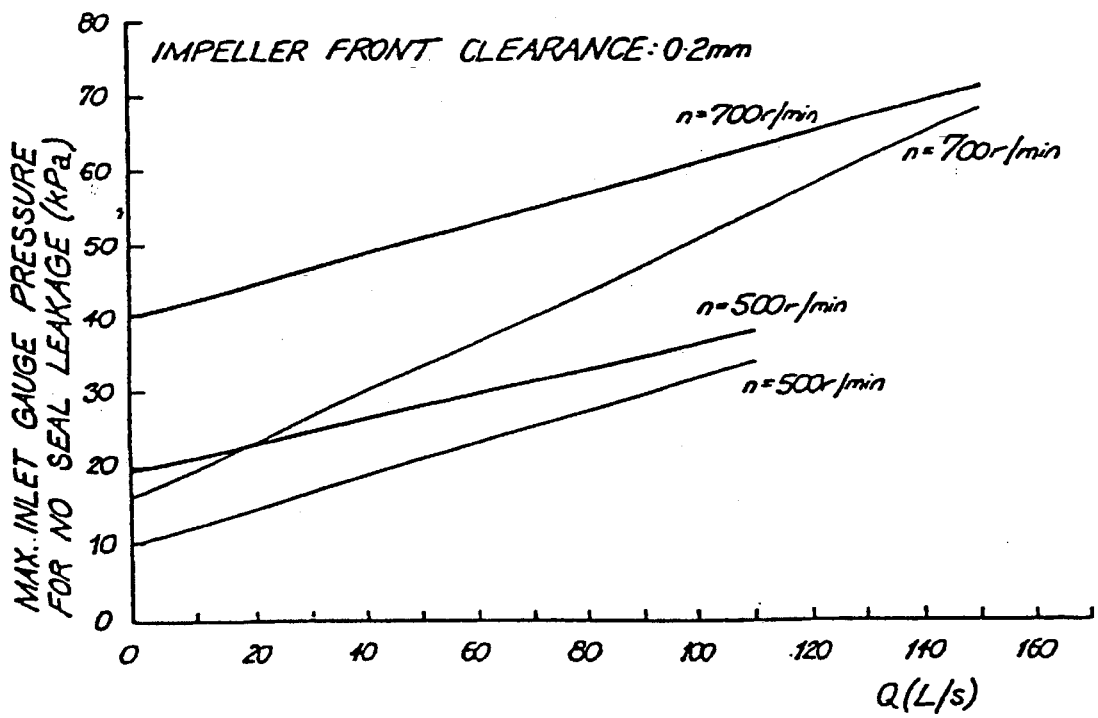

The graph which forms FIG. 5 of the drawings illustrates the difference in performance between the two pumps the darker line representing the pump according to the invention and the lighter line the conventional pump.

Again it can be seen the maximum inlet gauge pressure for no seal leakage increases significantly for the pump according to the present invention.

Finally, it is to be understood that various alterations, modifications and/or additions may be incorporated into the various constructions and arrangement of parts without departing from the spirit or ambit of the convention.

I claim:

1. A centrifugal seal device suitable for use with a pump which comprises a pump casing having a pump chamber therein and a pump impeller with an impeller passageway, the pump impeller being mounted on a rotatable shaft, the pump impeller being disposed within the pump chamber, the seal device including a main body which is disposed within a seal chamber and mounted for rotation on the pump shaft, a plurality of circumferentially spaced apart vanes on one side of the main body, the vanes extending from an inner zone of the main body to the outer peripheral edge of the main body, each vane including a curved leading edge portion with respect to the direction of rotation of the device and a main axis which extends between the inner and outer ends of the vane, the main body having an inner section and an outer section, characterised in that the vanes are configured in accordance with the following relative dimensions:

Rv/Deo in the range from 0.3 to 0.7

Rv=curvature of the leading edge of the vanes

Deo=outer diameter of the vanes.

2. A centrifugal seal device according to claim 1 wherein the ratio Rv/Deo is about 0.5.

3. A centrifugal seal device according to claim 2 wherein the ratio Tev/Wev in the range from 0.3 to 2.0:

Where

Tev=Thickness of the vanes

Wev=Width of the vanes.

4. A centrifugal seal device according to claim 2 wherein the ratio Tev/Wev is in the range from 0.3 to 1.5.

5. A centrifugal seal device according to claim 4 wherein the ratio Tev/wev is about 0.85.

6. A centrifugal seal device according to claim 5 wherein the main axis of the vanes extends radially or is angularly inclined rearwardly with respect to the direction of rotation from the radial direction by an angle αv in the range from 0°–30°.

7. A centrifugal seal device according to claim 6 wherein αv is about 7.5°.

8. A centrifugal seal device according to claim 7 wherein the main axis of the vanes is offset from the axis of rotation of the pump shaft preferably by a distance up to and including the thickness of the vanes of the device.

9. A centrifugal seal device according to claim 8 wherein the main axis of the vanes cuts a radial line between the inner and outer edges of the main body such as in the region of the diameter of the inner section.

10. A centrifugal seal device according to claim 9 wherein the ratio of the inner and outer diameter of each van $D_{evi}/D_{evo}$ is in the range from 0.2–0.7 wherein $D_{evi}$ is the inner diameter of the vanes and $D_{evo}$ is the outer diameter of the vanes.

11. A centrifugal seal device according to claim 10 wherein the ratio $D_{evi}/D_{evo}$ is in the range from 0.2–0.6.

12. A centrifugal seal device according to claim 11 wherein the ratio $D_{evi}/D_{evo}$ is 0.4.

13. A centrifugal seal device according to claim 12 wherein the width of the seal chamber (Wec) to the width of the impeller passageway (Wip) is in the range from 0.3 to 1.25.

14. A centrifugal seal device according to claim 13 wherein the ratio $W_{cc}/W_{ip}$ is about 0.5 to 1.25.

15. A centrifugal seal device according to claim 14 wherein the ratio outer diameter of the seal device to that of the pump impeller is greater than 0.6.

16. A centrifugal seal according to claim 15 wherein the ratio of vane width of the device to the width of the impeller vane passageway is from 0.05 to 0.6.

17. A centrifugal seal device according to claim 16 wherein the between vane width and width of the impeller vane passageway is in the range from 0.1–0.6.

18. A centrifugal seal device according to claim 7 wherein the width of the vanes Wev of the seal device are from 0.2 to 0.5 of the width of the seal chamber.

19. A centrifugal seal device according to claim 18 wherein the impeller has 16 vanes.

20. A centrifugal seal device according to claim 11, wherein the ratio $D_{evi}/D_{evo}$ is 0.5.

21. A centrifugal seal device according to claim 1 wherein the ratio Tev/Wev in the range from 0.3 to 2.0:
Where
Tev=Thickness of the vanes
Wev=Width of the vanes.

22. A centrifugal seal device according to claim 1 wherein the ratio Tev/wev is about 0.85.

23. A centrifugal seal device according to claim 1 wherein the main axis of the vanes extends radially or is angularly inclined rearwardly with respect to the direction of rotation from the radial direction by an angle αv in the range from 0°–30°.

24. A centrifugal seal device according to claim 1 wherein the main axis of the vanes is offset from the axis of rotation of the pump shaft preferably by a distance up to and including the thickness of the vanes of the device.

25. A centrifugal seal device according to claim 1 wherein the ratio of the inner and outer diameter of each van $D_{evi}/D_{evo}$ is in the range from 0.2–0.7 wherein $D_{evi}$ is the inner diameter of the vanes and $D_{evo}$ is the outer diameter of the vanes.

26. A centrifugal seal device according to claim 1 wherein the width of the seal chamber (Wec) to the width of the impeller passageway (Wip) is in the range from 0.3 to 1.25.

27. A centrifugal seal according to claim 1 wherein the ratio of vane width of the device to the width of the impeller vane passageway is from 0.05 to 0.6.

28. A centrifugal seal device according to claim 1 wherein the impeller has 16 vanes.

\* \* \* \* \*